United States Patent [19]

Chase

[11] 3,886,024
[45] May 27, 1975

[54] THICK-WALLED, FIBER-REINFORCED COMPOSITE STRUCTURES AND METHOD OF MAKING SAME

[75] Inventor: Vance A. Chase, Poway, Calif.

[73] Assignee: Whittaker Corporation, Los Angeles, Calif.

[22] Filed: Oct. 12, 1972

[21] Appl. No.: 296,998

[52] U.S. Cl. ................ 156/294; 138/141; 161/125; 161/139; 264/241
[51] Int. Cl. ............................................. F16l 9/14
[58] Field of Search ............ 156/293, 294; 161/125, 161/139; 138/112, 120, 140, 141; 264/284, 285, 291–293, 241

[56] References Cited
UNITED STATES PATENTS

| 2,991,808 | 7/1961 | Siegmann et al. | 156/244 |
| 3,542,079 | 11/1970 | Kelly, Jr. | 138/141 |
| 3,561,493 | 2/1971 | Maillard et al. | 138/141 |
| 3,742,985 | 7/1973 | Rubenstein | 138/141 |

FOREIGN PATENTS OR APPLICATIONS

| 840,630 | 1960 | United Kingdom | 156/294 |
| 883,383 | 1961 | United Kingdom | 156/294 |

Primary Examiner—George F. Lesmes
Assistant Examiner—Paul J. Thibodeau
Attorney, Agent, or Firm—Donald E. Nist

[57] ABSTRACT

Residual internal stresses in thick-walled, fiber-reinforced composite structures are minimized by fabricating the latter from a plurality of cured, thin-walled, fiber-reinforced shells in which the resin is a high temperature curing resin and which are telescoped together and bonded to each other at low temperatures using low temperature curing adhesive. The thin-walled shells may be unitary structures or they may be built up from segments. The shells are preferably tapered in their longitudinal direction when making long structures.

7 Claims, 5 Drawing Figures

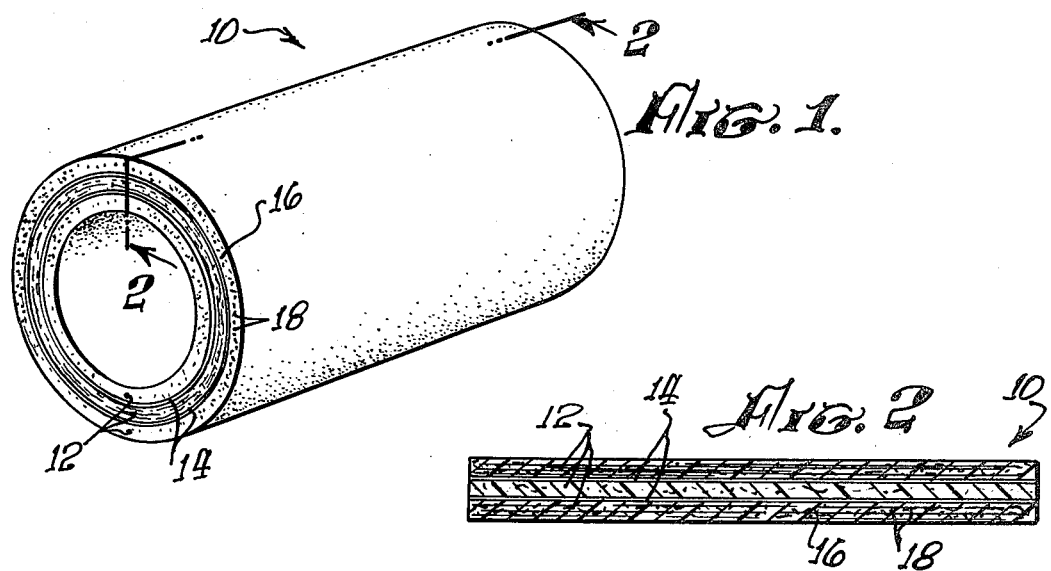
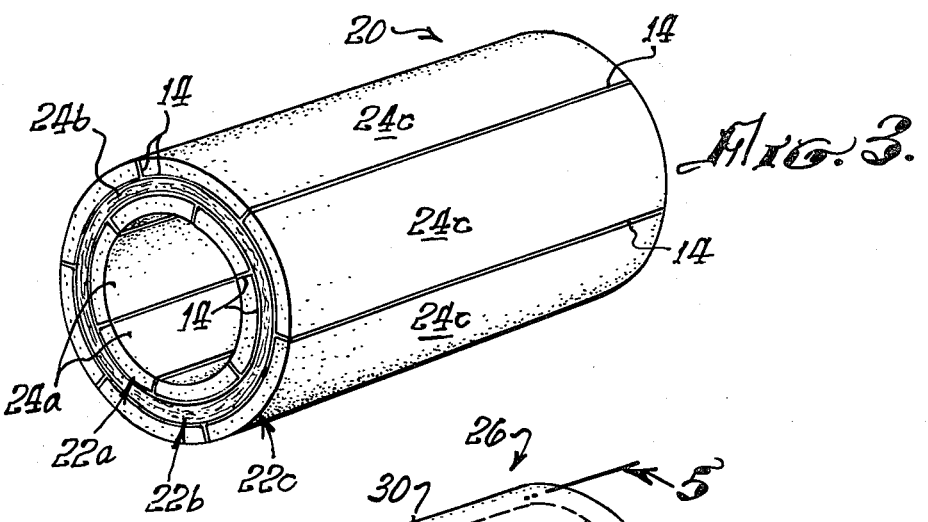
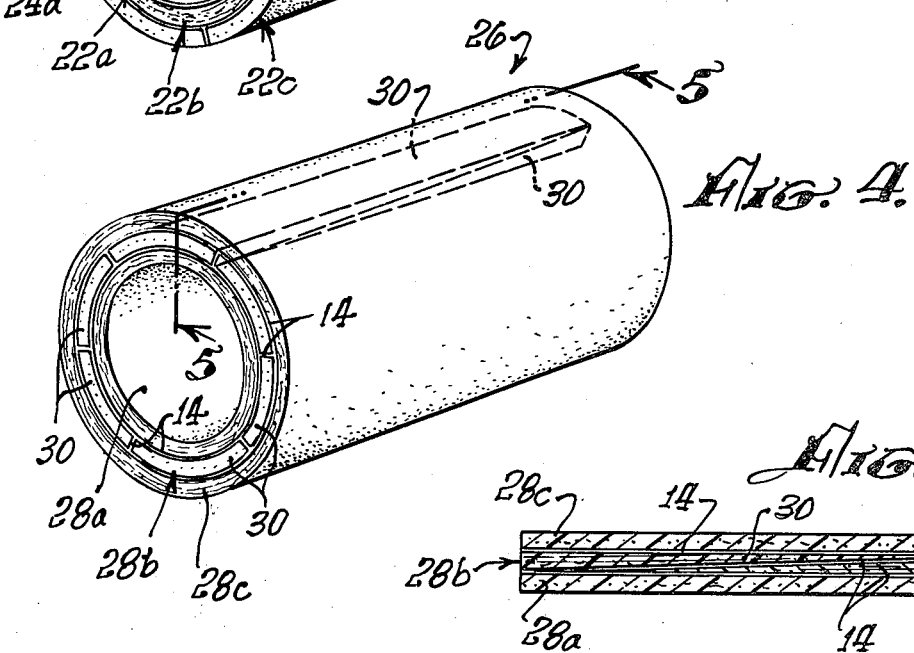
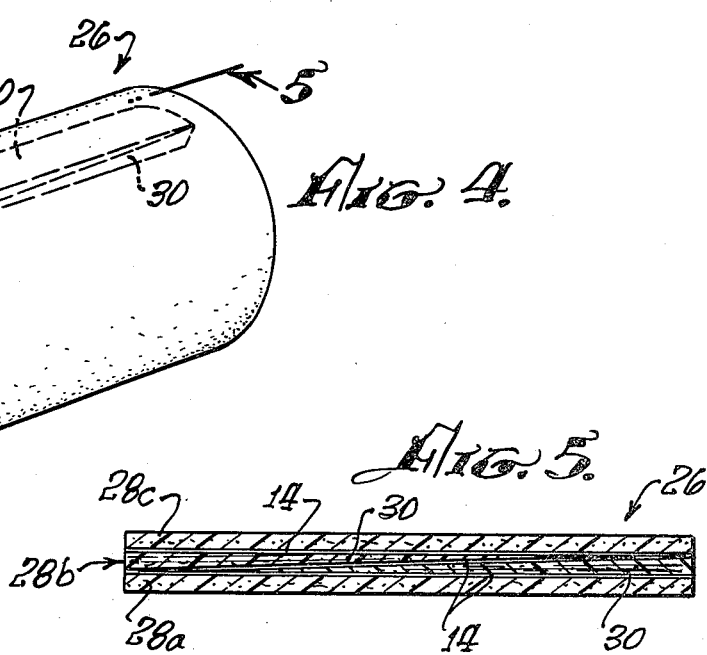
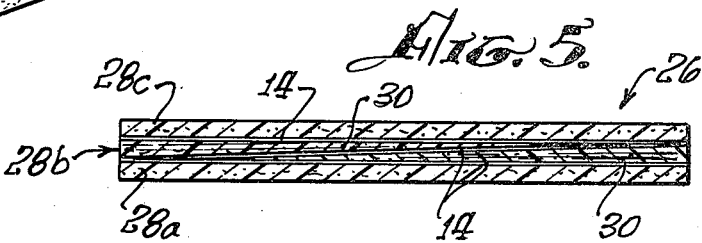

THICK-WALLED, FIBER-REINFORCED COMPOSITE STRUCTURES AND METHOD OF MAKING SAME

BACKGROUND OF THE INVENTION

This invention relates to fiber-reinforced resin composite structures.

The fabrication of thick walled, fiber-reinforced plastic composites, in particular, presents the problem of obtaining a finished structure which is substantially free of internal stresses. These internal stresses may be of a low magnitude resulting in a small percentage reduction of the ultimate strength potential of the overall structure. On the other hand, these stresses may be sufficiently high to result in ramdom failures within the structure such as delamination, resin crazing, etc.

Residual internal stresses may be produced in a composite structure, for example, from the winding technique employed in fabricating the structure or from differential thermal characteristics of the reinforcement and resin materials which manifest themselves during curing and cooling of the structure. The residual stress problem is further complicated by the use of both transverse and longitudinal fiber reinforcement.

Various techniques have heretofore been employed to alleviate or minimize residual internal stresses. One method for minimizing the stresses produced by winding techniques is to vary the winding tension as the wall thickness (part diameter) increases and to use multi-stage winding and curing operations to achieve the desired wall thickness. However, these techniques are not particularly satisfactory because they are time-consuming, expensive, and may require the use of highly skilled technicians. One technique for alleviating thermally-induced stresses is to cure the composite at as low a temperature as possible by using low temperature curing resins. This technique is not entirely satisfactory because the low temperature curing resins do not provide the properties, vis-a-vis the reinforcement material, in a composite which are obtainable from resin systems which require cure at elevated temperatures, e.g., > 300°F.

SUMMARY OF THE INVENTION

Thick-walled, fiber-reinforced composite structures are made by telescoping together a plurality of cured, thin-walled, fiber-reinforced shells to build up the desired wall thickness and bonding these shells together using a low temperature curing adhesive. The resin in the shells is a high temperature curing resin.

In one embodiment of this invention, the thin-walled shells are themselves segmented, i.e., they are formed from cured fiber-reinforced segments. In another embodiment, the shells are tapered in their longitudinal direction.

High performance is obtained by the use of thin-walled shells which are cured at a high temperature. This performance is not adversely affected by the use of a low temperature curing adhesive to bond the shells togeher. The result is a high performance structure which has minimal residual stresses.

The use of segments to form the shells also aids in minimizing internal stresses and particularly lends itself to longitudinal tapering. The use of tapered shells greatly facilitates the fabrication of multi-layered composites since it is difficult to hold the required thickness tolerances on uniformly thick shells so that the shells have only the desired spacing from each other for telescoping together. With the use of tapered components, the latter can more readily be wedged or nested together to produce the desired configuration and thickness wih any differences in length being easily eliminated by machining the ends of the composite structure.

DESCRIPTION OF THE DRAWING

FIG. 1 is a perspective view of a cylindrical composite structure fabricated by the method described herein using unitary, thin-walled shells.

FIG. 2 is a longitudinal, cross-sectional view of the wall of the structure of FIG. 1 taken along the line 2—2 of the latter Figure.

FIG. 3 is a perspective view of a cylindrical composite structure fabricated by the method described herein, but using longitudinally segmented, thin-walled shells.

FIG. 4 is a perspective view of a cylindrical composite structure of this invention illustrating the use of uniformly-thick cylindrical, thin-walled shells and tapered segments.

FIG. 5 is a longitudinal, cross-sectional view of the wall of the structure of FIG. 4 taken along the line 5—5 of the latter Figure.

DESCRIPTION OF THE PREFERRED EMBODIMENTS

The term "thin-walled," as used herein, is not used in an absolute sense alone but, instead, is used as a function of the diameter of the composite structure as well as in an absolute sense. That is, as the diameter of a composite structure increases, the actual thickness that can still be designated a "thin wall" (because of the substantial absense of internal stresses) increases. For example, a wall could be a thin wall if it was up to about 0.050 in. thick on a 4 in. diameter whereas a wall could still be a thin wall if it was up to about 0.250 in. thick on a 4 ft. diameter. However, regardless of the composite structure diameter, an upper limit exists on the thickness of a wall for it to be a thin wall. That upper limit is about 0.250 in. A thick wall is a wall which is substantially thicker than a thin wall and in which there will be substantial residual stresses when cured if the present invention is not employed in its fabrication. For example, a thick wall includes 0.125 in. thick walls on a 4 in. diameter and 0.500 in. thick walls on a 4 ft. diameter.

In FIG. 1 and 2, there is shown a thick-walled, fiber-reinforced composite structure which is designated by the numeral 10 and which is fabricated from a plurality of thin-walled, fiber-reinforced shells 12 bonded together by an adhesive 14.

The thin-walled shells 12 comprise a resin 16 and fibers 18 which function as reinforcement for the resin matrix. The resin 16 is a high temperature curing resin which cures at elevated temperatures on the order of 300°F–350°F although cure temperatures somewhat above and below this temperature range may be employed depending upon the characteristics of the particular resin 16 employed. The high temperature curing resins 16 employed in this invention are well-known in the fiber-reinforced composite art and include epoxy, phenolic and polyimide resins. Specific examples include Union Carbide's ERLA resin cured with metaphenylene diamine and Shell Chemical Company's Epon 828 cured with Nadic methyl anhydride.

The fibers 18 include any flexible material which serves to strengthen the resin matrix 16 and which is capable of withstanding the cure temperatures employed herein without significant strength loss. The fibers employed herein are also well-known and include boron, graphite, carbon and glass fibers.

Fabrication of the thin-walled shells 12 is accomplished using well-known techniques for making reinforced-resin laminates. For example, the fibers 18 may be incorporated in the resin 16 as a prepreg tape which is then wrapped or laid up by hand on a mandrel or other suitable surface, or the fibers 18 may be used in filament form with the filaments being drawn through a resin bath to coat the filaments which are then wound onto a mandrel to produce the shells 12. Thereafter, the shells 12 are cured at the appropriate high temperature. In the cured thin-walled shells 12, the fibers 18 may lie longitudinally, transversely (circumferential), on a bias, or any combination of these positions with respect to the longitudinal axes of the shells 12.

The cured, thin-walled shells 12 are provided with inner and outer diameters so that they can be telescoped into each other to thereby build up a structure having a desired wall thickness. They may also have any desired shape including cylindrical, conical, and curved shapes.

After the shells 12 are cured, their confronting or mating surfaces are coated with the adhesive 14. The latter is any low temperature curing adhesive which is capable of being cured at temperatures below about 150°F and which exhibits structural and thermal characteristics required by a particular composite. Such adhesives are well-known and include, for example, epoxy resins such as Epon 828/D and Epon 934.

Following application of the adhesive 14 to the appropriate shell surfaces, the resulting built-up structure is cured to thereby cure the adhesive and produce an integrated, fiber-reinforced composite structure. Because of the low temperatures employed in curing the adhesive 14, substantially no internal stress-producing expansion or contraction of the resin 16 or fibers 18 occurs and since the use of thin-walled shells 12 minimizes residual stresses in the shell sections, the resulting thick-walled, composite structure 10 retains minimal residual internal stress.

In FIG. 3, there is shown a thick-walled, composite structure 20 which comprises a plurality of thin-walled shells 22 bonded together by the low temperature curing adhesive 14. This composite structure 20 is fabricated in the same manner as the composite structure 10 of FIG. 1 except that one or more of the shells 22 is formed from a plurality of shell segments 24. The latter are produced by the method described for the shells 12 of FIG. 1.

To fabricate the inner segmented shell 22a, the following procedure may be used. Over and around a suitably sized mandrel (not shown) coated with a mold release agent, a plurality of cured shell segments 24a are positioned with the low temperature curing adhesive 14 applied to their confronting surfaces to form the inner cylindrical shell 22a. Thereafter, the intermediate and unitary shell 22b is slipped over the inner segmented shell 22a with adhesive 14 therebetween to serve as a collar to hold the inner shell segments 24a together until the composite is cured. Thereafter, the outer shell segments 24c are positioned over and around the intermediate shell 22b in the same manner to form the outer shell 22c. A metal collar (not shown) may then be placed over and around the resulting structure to hold the shell segments 24c in position until the curing step is completed. On the other hand, the intermediate shell 22b and the metal collar may be slipped into position with the shell segments 24a, 24c being threafter fitted into the annular spaces between the mandrel and intermedite shell 22b and between the latter and the metal collar. The assembled structure is then cured at a low temperature to obtain the cured composite 20.

In FIGS. 4 and 5, there is shown a thick-walled, composite structure 26 which comprises a plurality of thin-walled shells 28 bonded together with the low temperature curing adhesive 14. This composite structure is fabricated as previously described herein except that one or more of the shells 28 comprises a plurality of longitudinally-tapered segments 30 which are also bonded to each other with the adhesive 14. The tapered segments 30 are fabricated as previously described in connection with fabricaton of the shells 12.

Assembly of the components making up the thick-walled composite structure 26 may be made in a manner similar to that described herein in connection with fabrication of the structure of FIG. 3. In this case, the annular space between the inner and outer shells 28a and 28c may be filled by inserting tapered segments 30 from opposite ends of the structure in pared overlaping relation as is shown in FIG. 5 to form the intermediate shell 28b. Thereafter, the assembled structure is cured to cure the adhesive 14 and bond the components to each other.

I claim:
 1. A method of making a thick-walled, fiber-reinforced composite structure comprising the steps of:
  fabricating a plurality of thin-walled, fiber-reinforced resin shells of differing diameter such that said shells, when cured, can be telescoped together to produce a thick-walled structure, said resin in said shells being a high temperature curing resin selected from the group consisting of epoxy, phenolic and polyimide resins, each said shell having a thickness substantially less than the diameter of said thick-walled, composite structure and not being greater than about 0.250 in.;
  curing said thin-walled shells at the cure temperature for said resin;
  interposing a low temperature curing epoxy adhesive between confronting surfaces of said cured shells so that the walls of said cured shells alternate with said adhesive when said cured shells are telescoped together;
  telescoping said cured shells together to build up a thick-walled composite structure; and
  curing said adhesive at a temperature within its low temperature curing range to thereby bond said cured shells together to produce a cured, thick-walled composite structure.
 2. The method of claim 1 wherein at least one of said thin-walled shells is radially segmented, said segmented shell(s) being formed by:
  fabricating a plurality of thin-walled, fiber-reinforced, radially arcuate segments which, when radially assembled together, form a shell;
  curing each said segment at the cure temperature for said high temperature-curing resin; and applying a low temperature curing adhesive between confronting surfaces of said cured segments when assembled in a shell pattern.

3. The method of claim 2 wherein said composite structure is made by alternating segmented, thin-walled shells with non-segmented, thin-walled shells.

4. The method of claim 2 including, in addition:

fabricating said segments to provide them with a longitudinal taper such that when said segments are paired in over-lapping relationship, they form a shell wall of substantially uniform thickness; and applying a low temperature curing adhesive to confronting surfaces of said paired segments.

5. The method of claim 1 wherein said shells are provided with a longitudinal taper so that each pair of said tapered shells forms a thin-walled shell of substantially uniform thickness when paired in overlapping relation and wherein confronting surfaces of said tapered shells are coated with a low temperature curing adhesive.

6. The method of claim 1 wherein said high temperature curing resin is curable in the temperature range between about 300°F and about 350°F and wherein said low temperature curing adhesive is curable at a temperature below about 150°F.

7. A method of making a thick-walled, fiber-reinforced composite structure comprising the steps of:

fabricating a plurality of thin-walled, fiber-reinforced resin shells of differing diameter such that said shells, when cured, can be telescoped together to produce a thick-walled structure, said resin in said shells being a high temperature curing resin curable at a temperature between about 300°F and about 350°F, each said shell having a thickness substantially less than the diameter of said thick-walled composite structure and not being greater than about 0.250 in.;

curing said thin-walled shells at the cure temperature for said resin;

interposing a low temperature curing adhesive between confronting surfaces of said cured shells so that the walls of said cured shells alternate with said adhesive when said cured shells are telescoped together, said adhesive being curable at a temperature below about 150°F;

telescoping said cured shells together to build up a thick-walled composite structure; and curing said adhesive at a temperature within its low temperature curing range to thereby bond said cured shells together to produce a cured, thick-walled composite structure.

* * * * *